United States Patent [19]

Motegi

[11] Patent Number: 4,829,586
[45] Date of Patent: May 9, 1989

[54] PICTURE IMAGE RECORDING MEMORY CONTROL CIRCUIT

[75] Inventor: Chiaki Motegi, Hino, Japan

[73] Assignee: Kabushiki Kaisha Toshiba, Japan

[21] Appl. No.: 16,654

[22] Filed: Feb. 19, 1987

[30] Foreign Application Priority Data

Feb. 19, 1986 [JP] Japan .............................. 61-22339[U]

[51] Int. Cl.⁴ .............................................. G06K 9/00
[52] U.S. Cl. ..................................... 382/46; 340/727; 358/287
[58] Field of Search ................. 382/46; 358/293, 280, 358/287; 340/727

[56] References Cited

U.S. PATENT DOCUMENTS

| 4,168,488 | 9/1979 | Evans | 382/46 |
| 4,271,476 | 6/1981 | Lotspiech | 340/727 |
| 4,641,198 | 2/1987 | Ohta | 358/287 |
| 4,658,430 | 4/1987 | Anderson | 382/48 |
| 4,703,515 | 10/1987 | Baroody | 382/46 |

Primary Examiner—Leo H. Boudreau
Attorney, Agent, or Firm—Banner, Birch, McKie & Beckett

[57] ABSTRACT

Information rotating apparatus includes memory for storing and retrieving data units which were obtained from a plurality of lines of a manuscript. Each data unit from each line corresponds to other data units from other lines, correspondence being determined by the location along the line from which the data was obtained. Each data unit also includes a plurality of data bits. At first, the memory stores data units from each line in a manner to indicate the line of the manuscript from which the data units were obtained. After storing data units corresponding to each line, the memory retrieves each corresponding data unit which was obtained from each consecutive line of the manuscript sequentially. A corresponding data bit is selected from each retrieved data unit and the plurality of selected data bits are printed on a paper. As a result, the printed information is rotated 90°.

8 Claims, 4 Drawing Sheets

PICTURE IMAGE RECORDING MEMORY CONTROL CIRCUIT

BACKGROUND OF THE INVENTION

1. Field of the Invention

This invention relates to the field of memory control used for facsimile apparatus and, more particularly, to method and apparatus for rotating information stored in a facsimile memory device.

2. Description of the Prior Art

Generally, a facsimile receiver stores information in a memory device before supplying the information to a printer. The printer prints the information on a continuous, or roll, paper medium to provide the facsimile output. After printing the information, the facsimile device cuts the roll paper. If the stored information was obtained from paper with dimensions which correspond to that of the printing paper, then no paper is wasted. However, if the size of the printing paper is wider than the size of the paper from which the information was obtained, then the printed output paper will have blank spaces and will, therefore, be wasted.

For example, as shown in FIG. 1, a facsimile transmitter sends information signals which were obtained by reading A4 size paper. A facsimile receiver has only A3 size roll paper to print the information. Thus the receiver does not use a portion of the A3 paper and this portion is wasted. In this case, since the manuscript is 210×297 square millimeters and the length of a narrow side of roll paper is 297 millimeter, a space of 87×297 square millimeters remains blank after printing. This blank space constitutes a waste of the roll paper.

It would be desirable, therefore, to provide a facsimile receiver which is able to receive information signals obtained from paper having first dimensions and print the same information signals on paper having second dimensions without wasting paper.

SUMMARY OF THE INVENTION

It is, therefore, an object of the present invention to provide an apparatus capable of receiving information obtained from paper of a first size and printing information on paper of a second size without wasting paper.

It is a further object of the present invention to provide information rotating method and apparatus used in facsimile communication, which method and apparatus is capable of eliminating a waste of the printing medium.

According to this invention, and in order to realize the above noted objects, information rotating apparatus is provided for storing and retrieving data from memory in a manner to rotate the information before printing. The data is provided in a plurality of data units obtained from a plurality of lines of a read display medium. Each data bit and each data unit from each line of the read display medium corresponds to other data bits and other data units from other lines, correspondence being determined by the location along the line from which the data was obtained. The information rotating apparatus comprises a storing circuit for storing the plurality of data units in a manner to indicate the line of the read display medium from which the data units was obtained, a control circuit for controlling the storing circuit and a selecting circuit for selecting a corresponding data bit from each retrieved data unit. Means are also provided for displaying the plurality of selected data bits.

According to the method of the present invention, the plurality of data units are stored in memory in a manner to indicate the line of the read display medium from which the data unit was obtained. To rotate the data before it is redisplayed, corresponding data units, obtained from consecutive lines of the read display medium, are retrieved. A corresponding data bit is selected from each retrieved data unit and the plurality of selected data bits are displayed. The retrieving and selecting operations are continued until each data bit from each data unit has been selected and displayed.

BRIEF DESCRIPTION OF THE DRAWINGS

The subject matter which is regarded as the invention is particularly pointed out and distinctly claimed in the claims of the specification. The invention, however, both as to organization and method of practice, together with further objects and advantages thereof, may be best understood by reference to the following detailed description of the invention taken in conjunction with the drawings in which:

DESCRIPTION OF THE PREFERRED EMBODIMENTS

Figure 1:
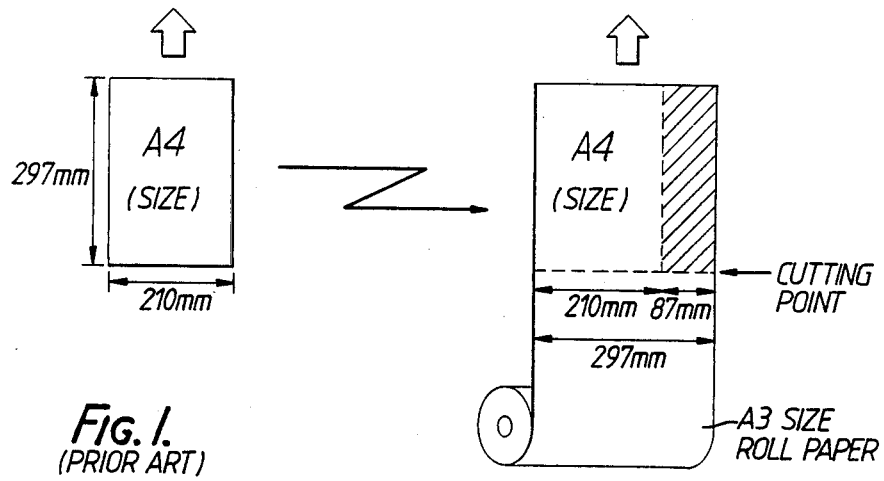
FIG. 1 is an illustration of the manner in which a conventional facsimile device prints information.
Figure 2:
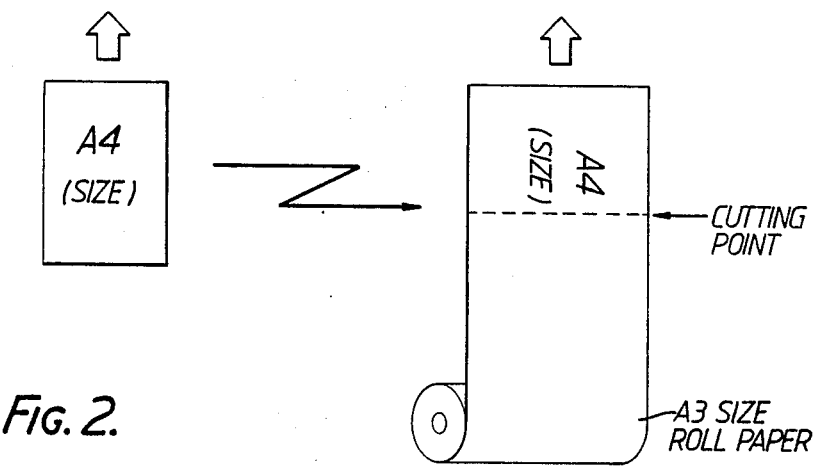
FIG. 2 is an illustratio of the manner in which a facsimile device prints information in accordance with the present invention.

As mentioned hereinabove the present invention is directed toward facsimile apparatus and methods wherein data is stored and retrieved in a manner which rotates the printed information such that paper is not wasted. For example in accordance with the present invention, a facsimile transmitter sends information signals which were obtained by reading A4 size paper. After receiving and storing the transmitted information signals, a facsimile receiver is able to rotationally print the information on A3 size paper, as shown in FIG. 2.

Figure 3:
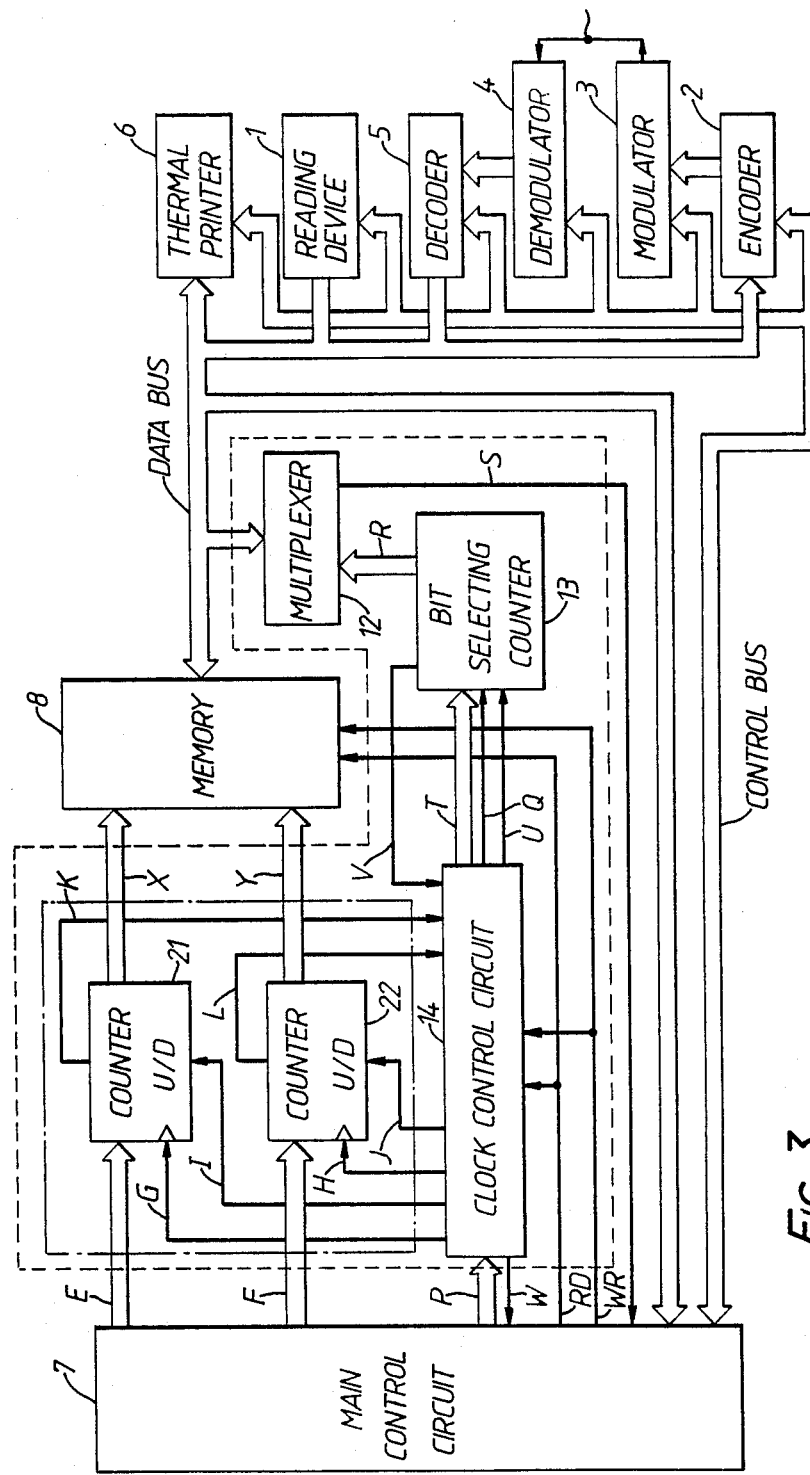
FIG. 3 shows an embodiment of the present invention in block diagram form.

Apparatus which comprises the present invention is shown in the functional block diagram of FIG. 3. Therein, apparatus for storing and retrieving data provided from a facsimile reading device 1 is shown. In the present embodiment facsimile reading device 1 comprises a photoelectric converting element such as a CCD (charge coupled device) for providing input data indicative of markings on the paper which is being read. Reading device 1 is adapted to read a plurality of lines of data and to provide a plurality of data units from each line. Typically the reading device comprises a plurality of photoelectric converting elements, each element for providing a plurality of data bits. Each data bit corresponds to a particular physical position along the width of the paper being read. In the present embodiment, each data unit comprises eight adjacent bits from a line of the paper. As the paper is moved through reading device 1, the device reads consecutive lines to provide each line of data.

While the present invention is being described by reference to reading device 1 of a facsimile transmitter, it will be apparent to those skilled in the art that the invention is not so limited. The present invention has applicability to any system which includes a read display medium for obtaining information and a write display medium for displaying the information. As an example, the present invention could be applied to a word processing system including a cathode ray tube (CRT) which may comprise both the read and write display mediums.

Reading device 1 is coupled to encoder 2 and modulator 3 for transmitting the input data to a receiving facsimile machine. In the receiving facsimile machine, the received data is stored in a memory 8 via a demodulator 4 and a decoder 5. It will be apparent to those skilled in the art that encoder 2, modulator 3, demodulator 4 and decoder 5 are conventional devices used in facsimile communication for performing their named functions.

Memory 8 is adapted to store the input data provided from decoder 5 before supplying the data to a printer 6. Accordingly, memory 8 must be adapted to store each data unit from each line which is read by reading device 1. For example, when reading A4 size paper, a typical facsimile transmitter will read 1,145 data bits, lengthwise. Each line will include 216 data units corresponding to 1,728 bits of data per line (each data unit comprising 8 bits of data). Therefore, memory 8 must be adapted to store 1,145×1,728 data bits. It will be apparent to those skilled in the art that while memory 8 is shown and described herein as a single device, it may actually comprise several integrated circuits (such as nine 64K DRAMS) including the necessary address control circuitry.

Memory 8 is responsive to a read (RD) and write (WR) signal, received from a main control circuit 7, for retrieving and storing data, respectively. Although the read RD and write WR signals are shown as separate signals in FIG. 3, it will be appreciated by those skilled in the art that they may comprise a single dual level signal. Memory 8 is also coupled to two up/down counters 21 and 22 for receiving address information therefrom. Memory 8 is adapted to respond to a first X address signal and a second Y address signal provided from counters 21 and 22, respectively, to store and/or retrieve data. In the present embodiment, memory 8 is responsive to each pair of X and Y address signals to retrieve one eight bit data unit.

Counters 21 and 22 are each adapted to provide the X and Y address signals sequentially in response to clock signals G and H provided from clock control circuit 14. Each counter 21 and 22 is adapted to provide a predetermined number of address signals (corresponding to the number of data units from each line for counter 21 and corresponding to the number of lines read from each page for counter 22) and thereafter provide a signal K and L to indicate each address has been supplied. Counters 21 and 22 are further adapted to count either up or down in response to signals I and J also provided from clock control circuit 14.

In the present embodiment, counters 21 and 22 may each comprise conventional up/down counters for providing the X and Y addresses. It will be apparent, however, to those skilled in the art that counters 21 and 22 may comprise any circuitry for providing the X and Y address signals. Further, while counters 21 and 22 are adapted to provide sequential addresses, those skilled in the art will appreciate that the X and Y address signals may be provided in any predetermined manner.

Figure 5:
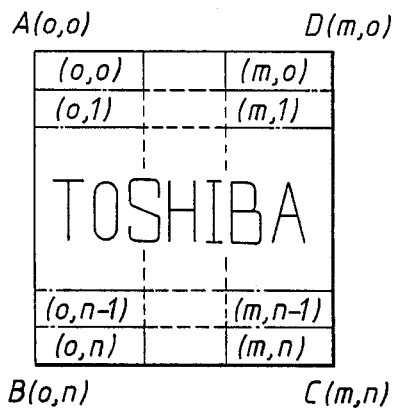
FIG. 5 is an illustration of a relation between address and information in accordance with the embodiment shown in FIG. 3.

In the preferred embodiment counter 21, which provides the X address signal, is used to provide address signals corresponding to each data unit of a line. Counter 22, which provides the Y address signal, is used to provide address signals corresponding to the line of the paper from which the data was obtained. Referring to FIG. 5 an array is shown for illustrating the manner in which data is stored in memory 8. Therein, address signals (X, Y) range from 0-m and 0-n, respectively.

Clock control circuit 14 comprises logic circuitry adapted to provide the control signals and perform the control functions described below by reference to FIGS. 4A and 4B. It will be apparent to those skilled in the art that clock control circuit 14 may comprise any circuitry for performing the described functions. As an example, clock control circuit 14 may comprise a microcomputing circuit, a logic array or other similar logic and/or analog circuitry. Main control circuit 7 comprises control circuitry for controlling the operation of the facsimile device. Main control circuit 7 is adapted to interface with the rotational data system of FIG. 3 as will be described below.

To print the information, memory 8 responds to counters 21 and 22 and main control 7 to provide data to a thermal printer 6. Thermal printer 6 comprises a thermal printing head which includes a line of heat generating elements and associated circuitry such as register, and semiconductor switches. The width of the line of heat generating elements is about 297 mm which corresponds to the length of A4 size paper. Thermal printer 6 is sometimes provided with two kinds of thermosensitive recording rolls of paper. One is A4 size roll paper which has a width of about 210 mm and another is A3 size roll paper which has a width of about 297 mm. A line of data, each bit of which corresponds to each one of the heat generating elements, is supplied to the head for printing on the paper.

Thermal printer 6 may also be adapted to provide a request signal to main control circuit 7 via the data bus when the A4 size roll paper is exhausted. Main control circuit 7 is responsive to the request signal to cause the apparatus of FIG. 3 to retrieve stored data in a manner to print rotationally. The rotational retrieving operation uses bit selecting counter 13 and multiplexer 12. Bit selecting counter 13 comprises an up/down counter which is responsive to clock signal Q from clock control circuit 14 for providing a sequential bit select signal R to multiplexer 12. Bit selecting counter 13 is further adapted to count either up or down in response to signal U from clock control circuit 14. In the preferred embodiment, counter 13 is used to provide bit selecting signals R for selecting one bit of a data unit.

Multiplexer 12 is connected to the data bus to select one bit of the data unit retrieved from memory 8. Multiplexer 12 provides each selected bit to main control circuit 7 via a single bit connection labled S in FIG. 3. As will be described more fully hereinbelow, the apparatus of FIG. 3 responds to main control 7 to rotate information for rotational printing.

Figure 4A:
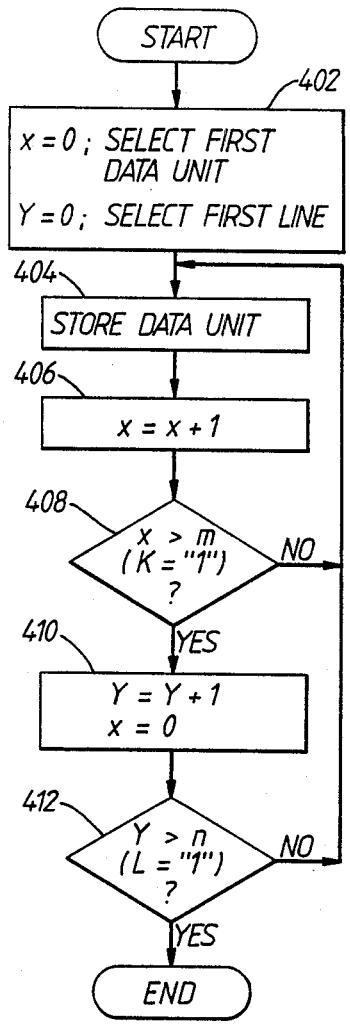
FIGS. 4A and 4B are decisional flow diagrams illustrating the operation of clock control circuit 14 shown in FIG. 3.

The method by which data is stored in the present embodiment is shown in FIG. 4A. Therein, counters 21 and 22 are each initialized at zero by signals E and F provided from main control circuit 7 (step 402). This initialization chooses or selects the first data unit (counter 21, X address) of the first line (counter 22, Y address). The first data unit is thereafter stored in address location (0,0) (step 404). The X address is incremented by one by providing a clock pulse G to counter 21 from clock control circuit 14 (step 406). Counter 21 determines whether each of the (m+1) data units have been stored (step 408) and, if so, provides an indication to clock control circuit 14 by activating signal K. If not, memory 8 continues to store data units and counter 21 continues to supply address signals until signal K is activated (steps 404-408). Accordingly, memory 8 stores each of the data units read from the first line at address locations (0,0) through (m,).

After signal K is activated, the X address is reset to zero (step 410). Also, the Y address is incremented by one by providing a clock pulse H to counter 22 from clock control circuit 14. Counter 22 determines whether each of the (n+1) lines of data has been stored (step 412) and, if not, memory 8 continues to store each of the )m+1) data units of the next line (steps 404-408). If so, counter 22 provides an indication to clock control circuit 14 by activating signal L. Clock control circuit 14 is responsive to the activation of signal L to activate signal W and thus provide an indication to main control circuit 7 that the entire page has been stored.

To print the information in the same orientation as it was read, the apparatus of FIG. 3 simply retrieves the data from memory 8 in the same manner as it was stored. However, as mentioned hereinabove, there are instances when it is desirable to print the information in an orientation which is rotated 90° from the reading orientation. In such cases, data is retrieved from memory 8 in the manner shown in FIG. 4B.

Figure 4B:
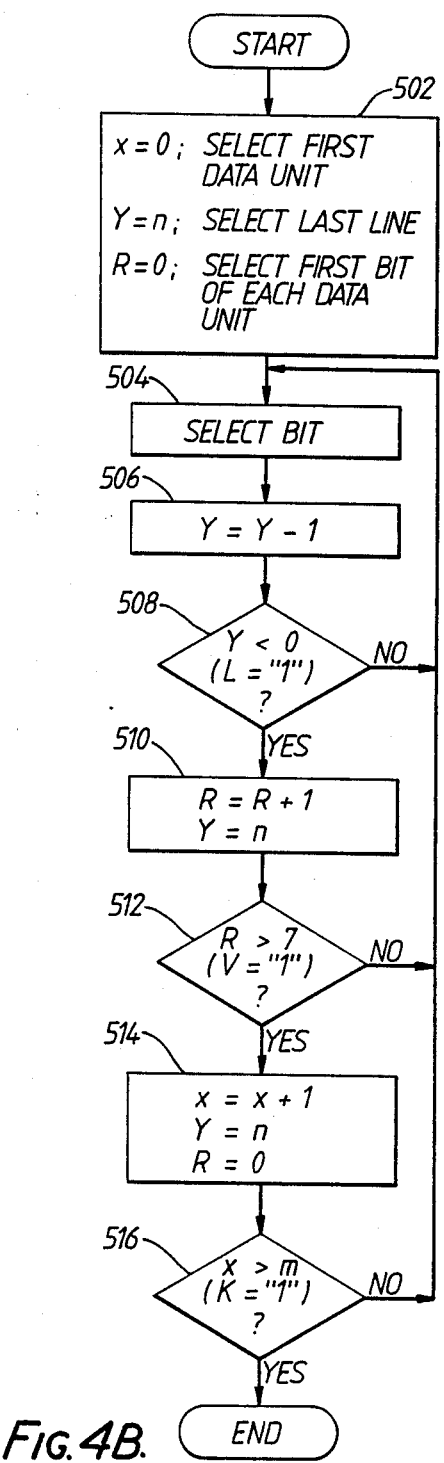

Referring to FIG. 4B, for rotational printing counter 21 is initialized at zero by signal E from main control circuit 7 and counter 22 is initialized at n by signal F from main control circuit 7 (step 502). This selects the first data unit from the last line of data. Also, bit selecting counter 13 is initialized at zero by signal T from clock control circuit 14 (step 502). This selects the first bit (or the most significant bit—MSB) from the first data unit of the last line of data.

The first data unit is thereafter retrieved from address location (0, n). At this time, since bit selecting counter 13 provides bit selecting signals R corresponding to the MSB of the data unit, multiplexer 12 selects the MSB of the retrieved data unit and provides it to main control circuit 7 (step 504). The Y address is decremented by one (step 506) by providing a clock pulse H to counter 22 from clock control circuit 14. Counter 22 determines whether the selected data unit of each line has been retrieved (step 508) and, if so, provides an indication to clock control circuit 14 by activating signal L. If not, counter 22 continues to supply address signals until signal L is activated.

Memory 8 continues to retrieve corresponding data units from each line of data and multiplexer 12 continues to select the MSB of data from each data unit (steps 504-508). In this manner, clock control circuit 14 controls the operation of memory 8 such that corresponding bits from corresponding data units of each line of the paper are selected. As mentioned above, correspondence is determined by the location along the line from which the data was obtained. Further, the data units are sequentially retrieved and correspond to consecutive lines of the reading paper.

After signal L is activated, the Y address is reset at n and the selecting bit position is incremented by one (step 510) by providing a clock pulse Q to bit selecting counter 13. Counter 13 determines whether each bit of the X address data units have been selected (step 512) and, if so, provides an indication to clock control circuit 14 by activating signal V. If not, counter 13 continues to supply the bit selecting signal R until signal V is activated. Multiplexer 12 continues to select one bit from the X address data unit until the LSB (least significant bit) of data from each corresponding data unit of all lines has been selected (steps 504-512). In short, each corresponding data unit of all lines is retrieved eight times and each time one of the eight bits is selected.

After signal V is activated, the address Y is reset at n and bit selecting signal R is reset to zero corresponding to the MSB (step 514). Also, at step 514, the X address is incremented by one, by providing a clock pulse G to counter 21 from clock control circuit 14. Counter 21 determines whether each of the (m+1) data units of each line has been retrieved (step 516) and, if not, memory 8 continues to retrieve each corresponding data unit of all lines and multiplexer 12 continues to select one bit of the retrieved data unit (steps 504-516). If so, counter 21 provides an indication to clock control circuit 14 by activating signal K. Clock control circuit 14 is responsive to the activation of signal K to provide an indication to main control circuit 7 (signal W) that the entire page has been read from memory. Thus, each data bit of each stored data unit has been selected.

In the preferred embodiment, each line of data is provided to thermal printer 6 from main control circuit 7 as it is retrieved, i.e., between steps 514 and 516 in FIG. 4B. This, of course, reduces the necessary buffer memory of main control circuit 7. It will be apparent, however, to those skilled in the art that any number of lines may be stored by main control circuit 7 before being supplied to thermal printer 6.

It will be further apparent to those skilled in the art that while the present embodiment has described clockwise rotation, counterclockwise rotation may also be employed. To do so, the proper initialization, step 502 of FIG. 4B, will be: X=m; Y=0 and R=7. Further, the conditions for resetting as well as the manner in which the values are changed will be altered accordingly.

Further, in the above-described embodiment, the retrieved data bit is printed on roll paper. However, the data may be printed on cut paper. Also, one data unit comprises eight data bits. However, the data unit may comprise any number of bits. As an example, each data unit may comprise sixteen data bits. Further, the above-described embodiment is used in a facsimile receiver and the request to print rotated information is supplied from the thermal printer. However, if the embodiment is used in a facsimile transmitter, the request is supplied from a facsimile receiver.

Further, if there is a difference between the density of the reading head and the density of the printing head, the produced new lines of data comprising the selected data bits may be adjusted so as to adapt to the thermal printer, as is known in the art. Furthermore, the memory may be disc type or other memory.

While the invention has been described herein by reference to several preferred embodiments, various modifications can be made without departing from the true scope and spirit of the invention. It is my intention, therefore, by the appended claims, to embody all such modifications.

I claim:

1. Apparatus for storing and retrieving data provided in a plurality of data units obtained from a plurality of lines of a read display medium, wherein each data unit includes a plurality of data bits, and wherein each data bit and each data unit from each line corresponds to other data bits and other data units from other lines, correspondence being determined by the location along the line from which the data was obtained, said apparatus comprising:

memory means for storing the plurality of data units from each line in a manner to indicate the line of the read display medium from which the data unit was obtained;

first up/down counter means capable of counting either up or down, for providing first address signals sequentially corresponding to consecutive lines of the read display medium, each said first address signal being used to indicate the line of data from which the data unit was obtained;

second up/down counter means capable of counting either up or down, for providing second address signals sequentially corresponding to adjacent portions of the line of the read display medium from which data was obtained, each said second address signal being used to indicate the location along the line of the read display medium from which the data unit was obtained, said memory means being responsive to each pair of said first and second address signals for storing and retrieving one data unit;

clock control means for controlling the count operation of said first and second up/down counter means to sequentially retrieve corresponding data units obtained from consecutive lines of the read display medium and for establishing the count direction of said first and second up/down counter means;

means for selecting a corresponding data bit from each retrieved data unit; and display means for displaying the plurality of selected data bits on a write display medium.

2. Apparatus as recited in claim 1
said clock control means being adapted to provide respective first and second clock signals to said first and second up/down counter means, said first and second up/down counter means being responsive to said first and second clock signals to provide said first and second address signals.

3. Apparatus as recited in claim 2 wherein said clock control means is adapted to provide a plurality of first clock signals for each second clock signal such that corresponding data units from each line of the read display medium are retrieved consecutively.

4. Apparatus as recited in claim 3 wherein said clock control means is further adapted to provide a plurality of second clock signals for each first clock signal such that the data is stored in a manner to indicate the line of the read display medium from which the data was obtained.

5. Apparatus as recited in claim 1 wherein said selecting means comprises:

counter means for supplying a count signal for indicating a data bit of the retrieved data unit to be selected; and multiplexer means responsive to the count signal for selecting the data bit from the retrieved data unit.

6. Apparatus as recited in claim 5 wherein said clock control means is adapted to provide a clock signal, said counter means of said selecting means being responsive to said clock signal to provide said count signal.

7. Apparatus as recited in claim 4 wherein said selecting means comprises:

counter means for supplying a count signal for indicating a data bit of the retrieved data unit to be selected; and multiplexer means responsive to the count signal for selecting the data bit from the retrieved data unit.

8. Apparatus as recited in claim 7 wherein said clock control means is adapted to provide a third clock signal, said counter means of said selecting means being responsive to said third clock signal to provide said count signal.

* * * * *